United States Patent [19]

Hahn

[11] 4,364,137
[45] Dec. 21, 1982

[54] RELEASABLE LOCKING DEVICE

[75] Inventor: Norbert Hahn, Cudahy, Wis.

[73] Assignee: Rite-Hite Corporation, Milwaukee, Wis.

[21] Appl. No.: 203,614

[22] Filed: Oct. 31, 1980

[51] Int. Cl.³ .............................................. E01D 1/00
[52] U.S. Cl. ......................................... 14/71.3; 16/82
[58] Field of Search ..................... 14/71.3, 71.7; 16/82

[56] References Cited
U.S. PATENT DOCUMENTS

| Re. 17,759 | 7/1930 | Hubbell | 16/82 |
|---|---|---|---|
| 1,491,556 | 4/1924 | Shaw | 16/82 X |
| 3,201,814 | 8/1965 | LeClear | 14/71.7 |
| 3,249,956 | 5/1966 | Zajac | 14/71.3 |
| 3,460,175 | 8/1969 | Beckwith | 14/71.3 |
| 3,606,627 | 9/1971 | Potter | 14/71.3 |
| 3,662,416 | 5/1972 | Brooks | 14/71.3 |
| 3,951,238 | 4/1976 | Dent | 16/82 X |
| 3,986,530 | 1/1974 | Le Clear | 14/71.3 |
| 4,047,258 | 9/1977 | Burnham | 14/71.3 |
| 4,110,860 | 9/1978 | Neff | 14/71.7 |

*Primary Examiner*—Nile C. Byers, Jr.

[57] ABSTRACT

A device is provided for releasably locking one member in a predetermined extended position relative to a second member to which it is hingedly connected. The device includes a rod having one end portion pivotally connected to the one member and spaced from the hinge connection between the members. The rod has elongated first and second sections in endwise relation. The second section circumferential dimension is less than that of the first section forming a beveled shoulder between the two sections. A guide is adjustably mounted on the second member and spaced from the member hinge connection. The guide has an open-ended passageway through which the rod sections slidably extend upon relative movement of the one member. The passageway end closest to the pivotally connected rod end portion has a beveled surface which at least partially delimits the passageway end. When the one member is in the extended position, the beveled shoulder and beveled surface frictionally engage one another and restrain relative movement of the one member from said extended position to a predetermined second position. Means is provided for applying an external force to the rod effecting movement of the one member from the second position to the extended position. Biasing means is provided on the guide laterally shifting the rod relative to the guide passageway to effect engagement between the beveled shoulder and surface when the rod second section is aligned in the passageway. The biasing means also effects variation in the frictional engagement between the shoulder and beveled surface.

9 Claims, 6 Drawing Figures

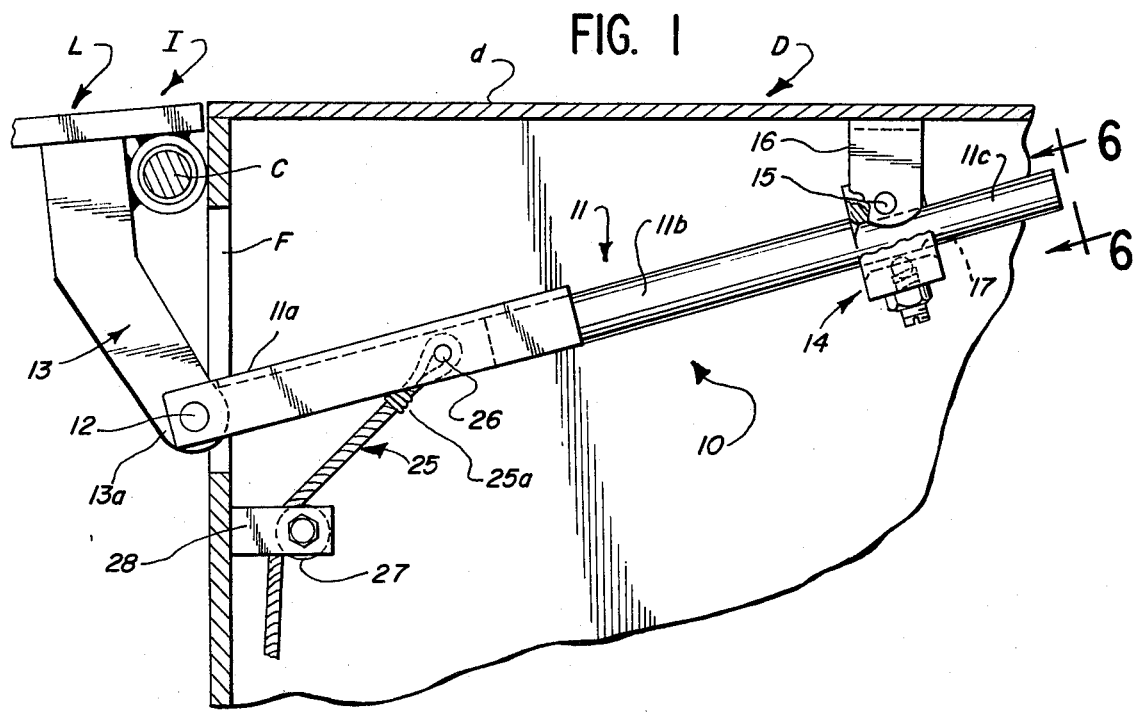
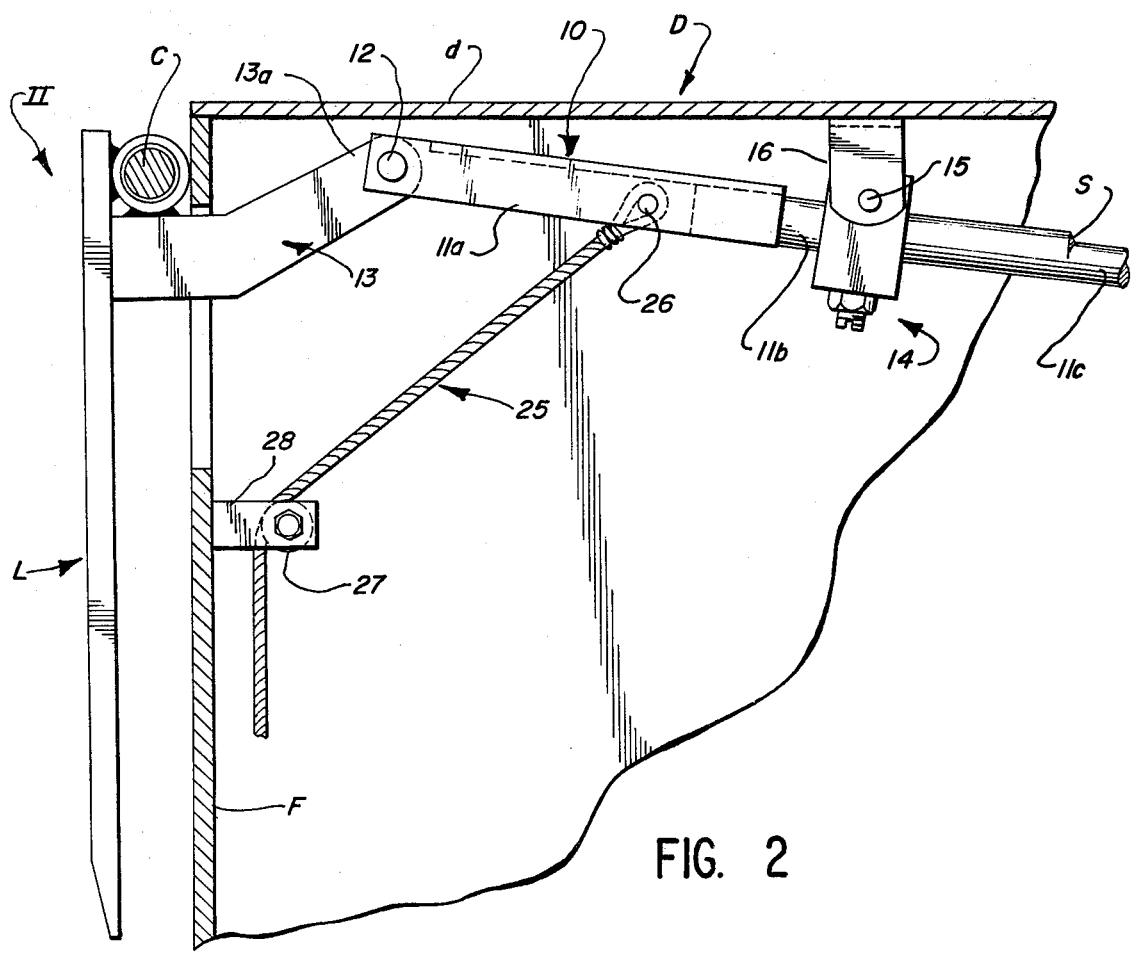

RELEASABLE LOCKING DEVICE

BACKGROUND OF THE INVENTION

Various devices of this general type have heretofore been provided, however, because of certain inherent design characteristics they have been beset with one or more of the following shortcomings: (a) they are of a costly and complex design; (b) they are highly susceptible to malfunction and require an inordinate amount of maintenance and service; (c) they are difficult to install and require substantial modifying of the existing structure on which the device is to be used; and (d) electric motors, hydraulic pumps, and various types of control switches are required to operate the device.

SUMMARY OF THE INVENTION

Thus, it is an object of the invention to provide a device of the type described which effectively overcomes the aforenoted shortcomings.

It is a further object of the invention to provide a device which embodies simple mechanical components, is of compact yet sturdy construction, and may be readily installed on new or existing structures.

Further and additional objects will appear from the description, accompanying drawings, and appended claims.

In accordance with one embodiment of the invention, a device is provided for use in releasably locking one member in a predetermined extended position relative to a second member to which it is hingedly connected. Pivotally connected to the one member is an end portion of an elongated rodlike element. The element includes an elongated first section and an elongated second section extending endwise therefrom. The longitudinal centerlines of the element sections are offset from one another and the circumferential dimension of the first section is greater than that of the second section whereby an exterior beveled shoulder is formed at the juncture of the two sections. The beveled shoulder at least partially encompasses the exterior of the second section. A guide for the rodlike element is adjustably mounted on the second member and is spaced from the hinge connection between the first and second members. The guide is provided with an open-ended passageway through which the sections of the rodlike element slidably extend upon relative movement of the one member. The end of the passageway, which is disposed closest to the pivotally connected end portion of the rodlike element, is at least partially delimited by a beveled surface. When the one member is disposed in the predetermined extended position, the beveled shoulder and the beveled surface frictionally engage one another and restrain relative movement of the one member from the said extended position to a predetermined second position. The one member is adapted to normally assume the predetermined second position. The circumferential dimension of the passageway is substantially the same as that of the first section of the rodlike element. Carried on the guide is a biasing means which exerts a resilient force on the rodlike element causing the latter to shift laterally relative to the passageway only when the second section of the element is aligned within the passageway.

DESCRIPTION

For a more complete understanding of the invention reference should be made to the drawings wherein:

FIG. 1 is a fragmentary side elevational view partially in cross-section of one form of the improved device and showing the one member disposed in the predetermined extended or first position.

FIG. 2 is similar to FIG. 1, but showing the one member in its normal predetermined second position.

Figure 3:
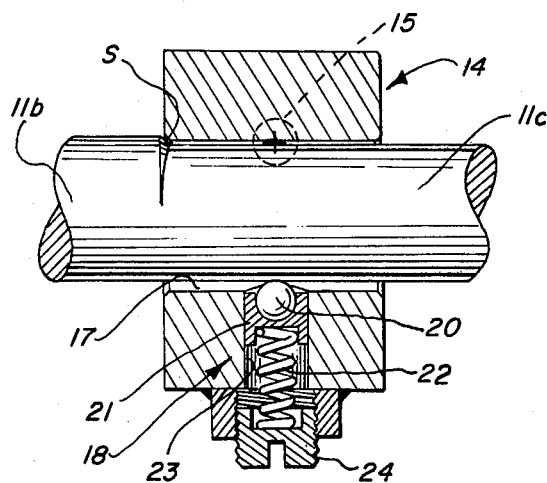
FIG. 3 is an enlarged fragmentary sectional view of the guide showing the beveled shoulder of the rodlike element in frictional engagement with the beveled surface formed at the end of the passageway.

For purposes of facilitating understanding of the improved device 10, the latter will be described in relation to a dockleveler D and a lip L hingedly connected at C to the front edge thereof. Docklevelers, such as disclosed in U.S. Pat. No. 4,110,860 are well known in the art and are installed in loading docks and the like wherein vehicles are normally parked adjacent the dock for loading and unloading thereof. The dockleveler is provided with an adjustable deck d which compensates for the height differentials which normally occur between the dock platform surface and the bed of the vehicle being loaded or unloaded. The lip is provided so as to span the gap which occurs between the dock platform front edge and the edge of the vehicle bed. The dockleveler and lip, when in an operative mode, enable fork lift trucks, carts, etc. to safely move between the dock platform surface and the vehicle bed.

When the vehicle moves away from the loading dock the dockleveler will assume its normal position wherein the exposed top surface of the deck is horizontally disposed and substantially coplanar with the surface of the dock platform. While the leveler is moving to its normal position, the lip will assume a depending (vertical) position relative to the deck top surface and the lower free edge of the lip will engage and be supported by stationary keepers (not shown) positioned adjacent the front surface of the dock and below the plane of the dock loading platform.

Because of the heavy load bearing forces to which the leveler and lip are frequently subjected, the deck of the leveler and the lip connected thereto are normally constructed of heavy gauge metal. Thus, the weight of the lip alone is substantial and thus, maintaining in a facile manner the lip L in a predetermined extended position I, see FIG. 1, relative to the front edge of the deck during certain stages of adjustment of the leveler is very important. The stages of adjustment in question occur when the dockleveler is being manuvered into an operative mode with respect to the vehicle bed. The manuver normally involves the deck d, which has the rear edge thereof, not shown, hingedly connected to a portion of the dock, being pivoted upwardly a sufficient amount so that the lip L carried on the front edge of the deck will clear the vehicle bed and thus, permit the lip to assume its extended position. Once the lip L is in its extended position I, the deck and the extended lip are pivoted downwardly as a unit about the hinge connection at the rear edge of the deck until the extended lip comes to rest upon the vehicle bed, at which point the deck and lip remain as a unit in an operative position wherein persons, lift trucks, carts, etc. safely can move between the vehicle bed and the loading platform.

Various devices have heretofore been utilized to retain the lip in its extended position while the lip and deck are being moved towards the vehicle bed. Such devices, however, have normally utilized various types of hydraulic cylinders, springs, etc. to perform this function. These prior devices are normally costly, difficult to service and maintain, and oftentimes are prone to malfunction.

The improved device 10 effectively overcomes these problems, and as seen in FIGS. 1 and 2, includes an elongated rod or rodlike element 11. One end portion 11a of element 11 is pivotally connected at 12 to the free end 13a of a depending arm 13, which is secured by welding to the concealed surface of the lip L. The pivotal connection 12 is spaced a substantial distance from the hinge connection C. One of the components of the hinge connection C is secured by welding or the like to a depending frame section F provided at the front edge of the deck d. The frame section F may have various configurations and is positioned so as not to interfere with the movement of the arm 13 and element 11 as the lip L moves to various positions of adjustment with respect to the deck of the leveler.

A guide member 14 is provided which is pivotally connected at 15 to a bracket 16 fixedly mounted on and depending from the concealed surface of the deck d. The bracket 16 is disposed a substantial distance from hinge connection C and the pivotal axes C and 15 are disposed in spaced, substantially parallel relation. The guide member is provided with a passageway 17 which extends transversely of the pivotal axis 15. The passageway is sized so as to slidably accommodate and support portions of the rodlike element 11, as will be described more fully hereinafter. The guide 14 is substantially self-aligning with respect to the element section 11b.

Figure 5:
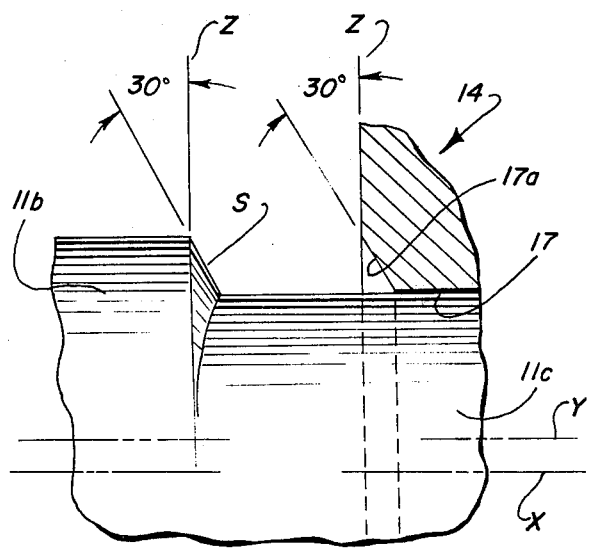
FIG. 5 is an enlarged fragmentary sectional view of the guide showing the relative angularity of the beveled surface at the end of the passageway and the beveled shoulder formed on the rodlike element.
Figure 6:
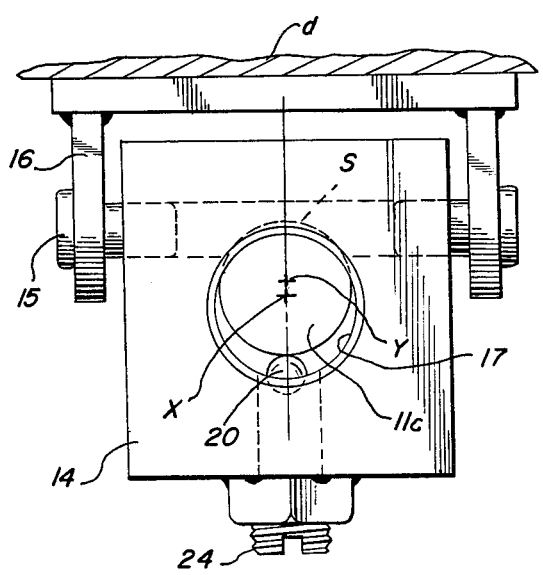
FIG. 6 is an enlarged fragmentary end view taken along line 6—6 of FIG. 1.

Element 11 includes a first section 11b which is preferably of cylindrical configuration. The circumferential dimension of section 11b closely approximates the corresponding dimension of passageway 17 and is slidable therein in an endwise direction. Extending endwise from the free end of section 11b is a second section 11c, the latter having a smaller circumferential dimension than section 11b. The longitudinal centerline X of section 11c is offset relative to the longitudinal centerline Y of section 11b, see FIG. 6. By reason of this centerline offset, a shoulder S is formed at the juncture between the two sections. The shoulder S at least partially encompasses the exterior of section 11c. As noted in FIG. 5, shoulder S is beveled preferably at an angle of approximately 30° relative to an axis Z disposed transverse to the centerline X of section 11c of element 11.

In a similar manner, the end 17a of the passageway 17, adjacent the shoulder S, is chamfered so as to form a beveled surface which is disposed at an angle of approximately 60° to the centerline Y or 30° relative to the endface of guide member 14.

Figure 4:
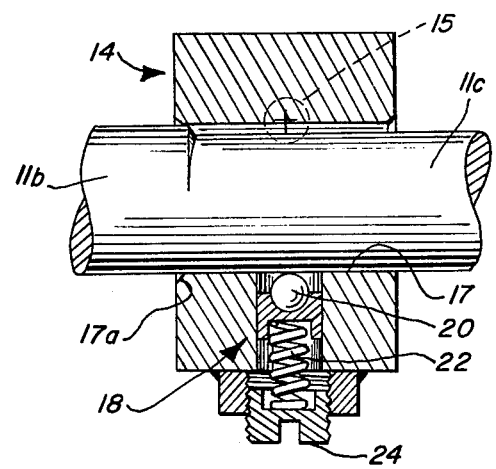
FIG. 4 is similar to FIG. 3, but showing the first section of the rodlike element aligned with the guide passageway and the beveled shoulder and beveled surface not in frictional engagement.

Member 14 is provided with a biasing means 18 which, in the illustrated embodiment, is disposed beneath the portion of element 11 accommodated in the passageway 17. Biasing means 18, as shown in FIGS. 3 and 4, includes a ball or similar piece 20 supported by a slidable retainer 21. The underside of retainer 21 is engaged by the upper end of a coil spring 22, which, in turn, is disposed within a bore 23 formed in the lower portion of the guide 14 and extending substantially radially of passageway 17. The lower end of spring 22 is contacted by a plug 24 which is threadably mounted in the lower or exposed end of the bore 23. Thus, the tension of spring 22 may be varied by adjusting the plug within the bore. If the spring tension is increased, greater external force will be required to overcome the frictional engagement between the beveled shoulder S and end surface 17a of the passageway 17 and thus, enable the element 11 to move endwise to the right, as seen in FIG. 1, relative to the guide 14 and allow the lip L to resume its normal inoperative position II, see FIG. 2. By reason of the beveled shoulder and beveled surface being at an angle of approximately 30°, adjustment of plug 24 does not become as critical as might otherwise be the case in order for the device to meet certain operating parameters.

The spring loaded ball 20 exerts an upward force on the underside of the element 11 and, when the element section 11c is aligned within the passageway 17, the element will be shifted laterally relative to the passageway, see FIG. 3, so that shoulder S and the beveled surface 17a will be in substantial axial alignment.

To effect automatic movement of the lip L to its predetermined extended position I when the deck d of the dockleveler is pivoted upwardly, there is provided a cable 25 which has the upper end 25a thereof connected to element 11 by a suitable fastener 26 carried by the element. As seen in FIGS. 1 and 2, the fastener is disposed between the pivotal connection 12 and the beveled shoulder S. Cable 25 passes over a guide pulley 27 which is mounted on frame F by a U-shaped bracket 28 and thus, lateral movement of the cable is significantly reduced. The lower end of the cable, not shown, is anchored to a stationary portion of the dockleveler or dock. The length of the cable 25 is such that, when the deck d pivots upwardly a predetermined amount, the cable will become taut, causing the element 11 and guide 14 to pivot as a unit about the pivot connection 15 of the guide. Simultaneously with such pivoting, the element 11 will slide endwise to the left relative to the guide. Such endwise motion of element 11 will be transmitted to the connection 12 between element 11 and the arm 13 connected to lip L, causing the latter to pivot in a clockwise direction about hinge connection C to the extended position I.

Besides effecting pivotal movement of the lip L, the cable 25 also limits the extent to which the deck d can be pivoted upwardly. To reduce the shock and stress, when the deck reaches its uppermost limits, the cable may have one end thereof connected to a heavy-duty coil spring, not shown.

As aforementioned, the resilient force exerted on element 11 by ball 20 can be varied by a simple manual adjustment of plug 24, and thus, increase or decrease the magnitude of the frictional engagement which can be attained between shoulder S and beveled surface 17a. The frictional engagement should be such that it will be overcome and the lip L will assume its fully down position II under any of the following conditions: (a) when the vehicle moves away from the dock while the lip is resting upon the vehicle bed; (b) the lip, while in an extended position, is accidentally struck by a vehicle backing into the loading dock; and (c) when the lip is subjected to a sudden shock while in an extended position due to the deck coming to an abrupt stop while moving upwardly or downwardly and no vehicle is parked at the dock.

Under condition (a), when the lip is resting on the vehicle bed, the lip L and deck d assume a substantially coplanar relation causing cable 25 to slacken a small amount and a small axial gap to be formed between the shoulder S and beveled surface 17a. Thus, when the vehicle bed moves away from lip L, the weight of the lip L will cause the latter to pivot downwardly a few degrees until the cable slack is taken up and the axial gap is closed. The sudden application of this pivoting force is greater than the frictional force attainable between the shoulder and beveled surface due to the adjustment of the plug 24 and thus, the shoulder will slide past the beveled surface and cam the ball 20 into the bore 23.

In conditions (b) and (c), the lip is disposed in its extended position I and in the one case (b), the vehicle strikes the elongated free edge of the lip L and causes the connection C to be raised and the deck d to move upwardly a corresponding amount and the lip to pivot downwardly.

Under condition (c), when the momentum of the deck and lip moving together either upwardly or downwardly is suddenly stopped, the momentum, when added to the weight of the lip itself, will overcome the adjusted frictional forces.

Thus, in any of the aforenoted conditions the lip will be released without causing any structural damage to other parts of the dockleveler.

When the lip has moved to its down position, after the vehicle bed has disengaged the lip L, the deck d will be temporarily held in a fixed position by suitable mechanism, not shown, forming a part of the dockleveler and well known in the art, and then will either automatically pivot slowly to its normal horizontal position, or will move to such position by a person stepping on the exposed surface of the deck d. In either case, the lower free edge of the depending lip L will normally engage keepers, not shown, which are fixedly mounted on the front of the dock, and thus, provide vertical support for the front edge of the deck d and maintain the latter in a horizontal position.

Thus, it will be seen that a simple, yet sturdy, releasable locking device has been disclosed which embodies a minimum number of components, is easy to install and service, and may be readily adjusted to vary the amount of external force required to effect unlocking of the device and thereby prevent damage occurring to various components of the dockleveler under certain operating conditions. The size and shape of the device's components may vary from that shown without departing from the scope of the invention.

I claim:

1. A device for releasably locking one member of a pair of hingedly connected members in a predetermined extended first position relative to the second member of the pair, the one member being adapted to normally assume a predetermined second position relative to the second member; said device comprising an elongated rodlike element having one end portion thereof adapted to be pivotally connected to the one member at a location spaced from the hinge connection between the pair of members, said element being provided with an elongated first section disposed adjacent the pivotally connected one end portion and an elongated second section extending longitudinally from said first section, said second section having a smaller circumferential dimension than said first section and corresponding exterior segments of said first and second sections coacting to form a beveled shoulder at least partially encompassing the exterior of said second section; guide means adapted to be adjustably connected to the second member and spaced from the member hinge connection, said guide means being provided with an open-ended passageway through which the sections of the rodlike element slidably extend upon relative movement of the one member, the end of the passageway closest to the pivotally connected end portion of said rodlike element being provided with a beveled surface at least partially delimiting the passageway end, the beveled surface and the beveled shoulder frictionally engaging one another and resisting a predetermined force urging relative movement of the one member from the predetermined first position to the second position; biasing means carried by said guide means and exerting a resilient force on said rodlike element causing the latter to laterally shift relative to the guide means passageway only when the second section of the element is aligned within the passageway; and means engaging said rodlike element for applying a predetermined external force thereto effecting endwise movement of said element relative to said guide means and movement of the one member from the predetermined second position to the predetermined first position.

2. The device of claim 1 wherein the bevel angle of the shoulder and the surface of the end of the guide means passageway are substantially the same.

3. The device of claim 1 wherein the means for applying a predetermined external force to the rodlike element engages the rodlike element at a location intermediate the pivotally connected one end portion and the beveled shoulder.

4. The device of claim 1 wherein the guide means is adapted to be pivotally connected to the second member; the pivotal axis of the guide means and the pivotal axis of the connection between the end portion of the rodlike element and the first member are in spaced, substantially parallel relation.

5. The device of claim 4 wherein the pivotal axis of the guide means is substantially transversely disposed relative to the longitudinal centerlines of the rodlike element first and second sections.

6. The device of claim 1 wherein the passageway formed in the guide means has a cross-sectional configuration which substantially conforms to the circumferential configuration of the rodlike element first section.

7. The device of claim 2 wherein the bevel angle measured relative to the longitudinal centerline of the rodlike element first section is about 60°.

8. The device of claim 1 wherein the biasing means includes means adjustably mounted on the guide means for varying the resilient force exerted on the rodlike element and the frictional engagement between the shoulder and the beveled surface.

9. The device of claim 1 wherein the element second section has a longitudinal centerline which is laterally offset relative to a longitudinal centerline of the element first section.

* * * * *